United States Patent [19]

Cazel et al.

[11] 4,111,549
[45] Sep. 5, 1978

[54] PLATEMAKER AND CONTACT FRAME EXPOSURE INDICATOR

[76] Inventors: Thomas R. Cazel, 516 Rose St., Addison, Ill. 60101; Gerald C. Cazel, 811 Park, Springfield, Ill. 62704

[21] Appl. No.: 803,733

[22] Filed: Jun. 6, 1977

[51] Int. Cl.$^2$ .......................... G03B 27/74; G01J 1/42
[52] U.S. Cl. ...................................... 355/68; 356/227; 355/83; 355/120
[58] Field of Search .............................. 355/18, 67–70, 355/83, 120, 38; 356/227; 340/221, 227 R; 307/117

[56] References Cited

U.S. PATENT DOCUMENTS

| | | | |
|---|---|---|---|
| 2,510,142 | 6/1950 | Richards | 355/83 |
| 3,351,766 | 11/1967 | Weisglass | 355/83 |
| 3,458,262 | 7/1969 | Greenlee | 355/68 X |
| 3,682,551 | 8/1972 | Bradley et al. | 355/120 |

*Primary Examiner*—L. T. Hix
*Assistant Examiner*—W. J. Brady
*Attorney, Agent, or Firm*—John J. Kowalik

[57] ABSTRACT

An exposure indicator which is attachable to a hinged glass mask cover frame, the indicator comprising a light emitting diode having one end lead connected in series through a light sensitive cell; a sensitivity-controlling resistance and switch to the appropriate pole of a source of electrical potential, such as a battery, the other pole of the battery being connected to the other end lead of the diode; the switch being arranged so that it is closed when the glass mask frame is closed against the blanket frame on which there is loaded a light-sensitive printing plate, and onto which an activating light is adapted to be directed, whereupon the light-sensitive photo cell is activated (resistance decreased) so that current is allowed to flow from the battery, through the switch and the light-activated silicon controlled rectifier, causing the diode to glow, thus indicating that the material has been exposed, and thereby preventing a second exposure due to the inattentiveness or forgetfulness of the operator. The operator, to remove the exposed plate, must move the masking glass frame to open position, which opens the switch of the indicator and extinguishes the diode.

10 Claims, 6 Drawing Figures

PLATEMAKER AND CONTACT FRAME EXPOSURE INDICATOR

DISCUSSION OF THE PRIOR ART

Applicant has for many years been employed in the printing art and has observed on numerous occasions that plates or other light sensitive graphic arts materials have been ruined by the operator, either because he was engaged in too many different operations simultaneously and became forgetful as to whether he had exposed the material, or because of inattentiveness would unconsciously flash the activating light the second time.

Presently, no devices and certainly no inexpensive device is available to indicate exposure of the material.

SUMMARY OF THE INVENTION

This invention is directed to a novel indicator which is readily attachable to existing equipment.

A specific object is to provide a novel self-sufficient indicator which is unobtrusive and which may be secured to the glass cover frame of currently available and used printing plate exposure equipment.

The invention comprehends providing a small approximately 3 inch by 3 inch box within which there is mounted an electric battery which has one pole connected to one end of a tilt mercury switch or the like, the other end of the switch being connected to one end of a preferably adjustable resistor, the other end of which is connected to one end of a light sensitive cell such as a light-activated silicon controlled rectifier, the other end of the light sensitive cell being connected to one end lead of a light emitting diode, which has its other end lead connected to the other pole of the battery, whereby when the switch is closed and a light of sufficient intensity is directed over the printing plate, the directed light is also effective to activate the silicon controlled rectifier, causing current to flow from the battery through the diode and the position switch to the battery, thus lighting the diode and indicating to the operator that the material has been exposed.

The invention also contemplates providing an exposure indicator device with a permanent magnet attached to its case, which may be used to clamp the device against the steel cover frame of the plate maker, thus making it removable and adjustable.

In its broad aspects, the invention is concerned with providing a simple, inexpensive, and effective indicia to notify the operator whether or not the printing plate or other light sensitive material has been exposed; and which is automatically reset upon the exposed material being removed and replaced by unexposed material simply by the positioning of the glass cover from exposing position to removing position and return to the exposing position being ineffective to activate the indicia, which must be activated by directing the exposure light of predetermined intensity thereagainst, whereby it is unaffected by stray lights which are ineffective to expose the material.

These and other objects and advantages inherent in and encompassed by the invention will become more readily apparent from the specification and the drawings, wherein.

Figure 5:
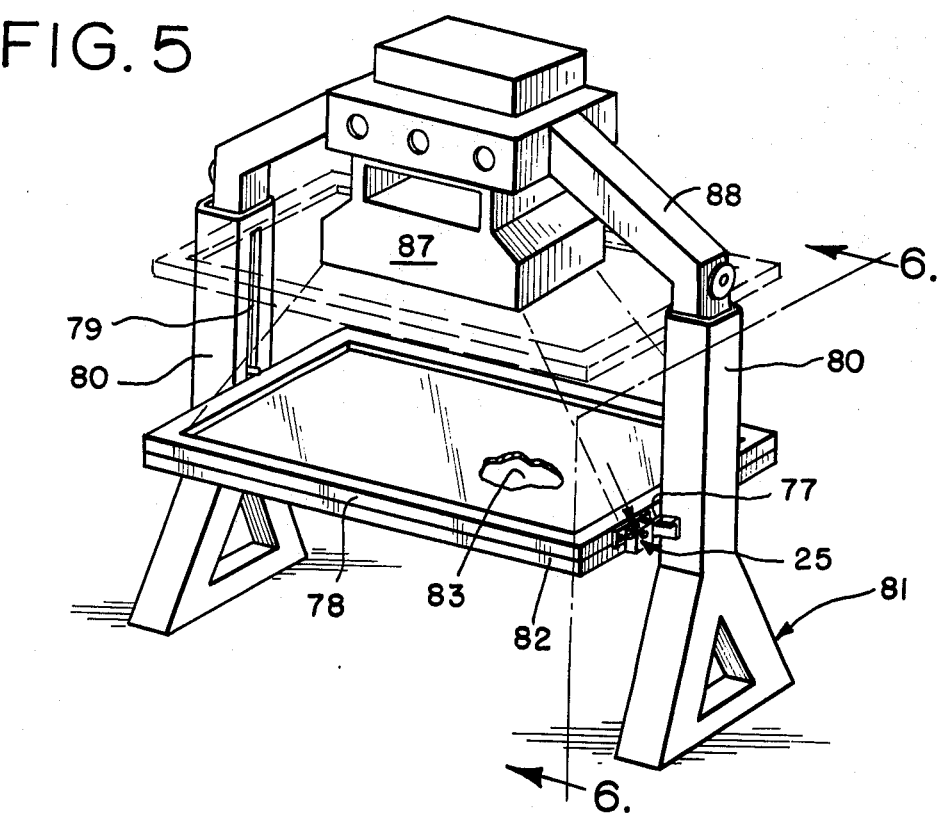
FIGS. 5 and 6 illustrate a different apparatus and switch mechanism and FIG. 6 is an enlarged partially sectional view of the switching mechanism.
Figure 5:
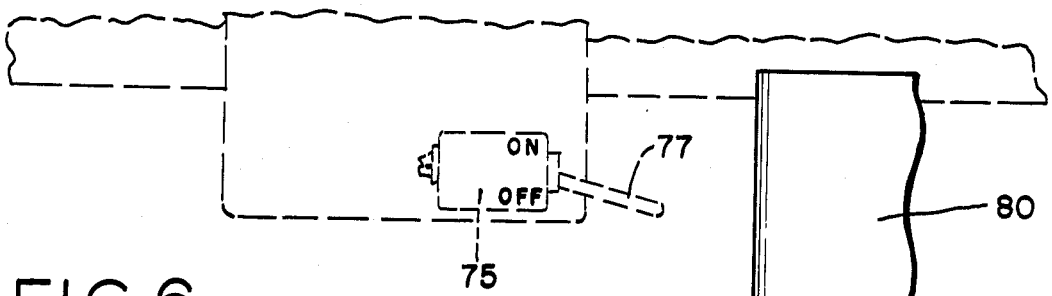

FIG. 5 being a perspective view of the apparatus; and

Figure 6:
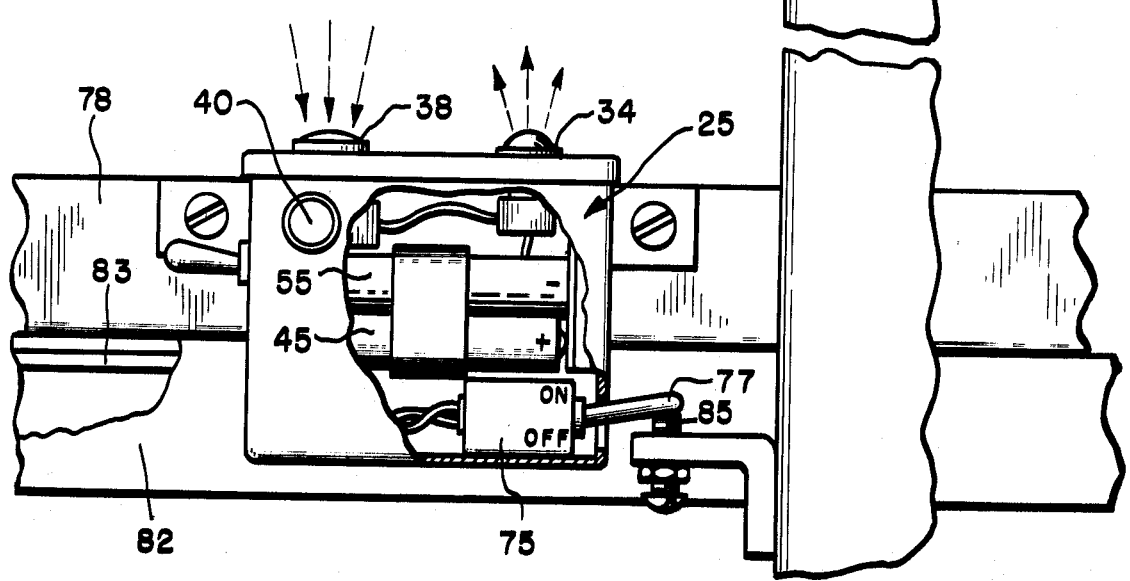

FIG. 6 being an enlarged fragmentary view of a portion thereof.

DESCRIPTION OF THE INVENTION—FIGS. 1-4

Figure 1:
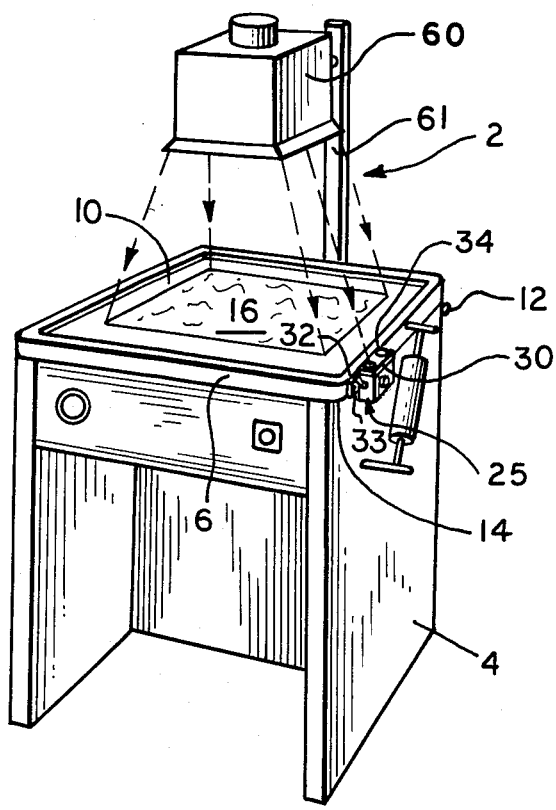
FIG. 1 is a perspective view of a printing plate maker incorporating the novel exposure indicator.
Figure 2:
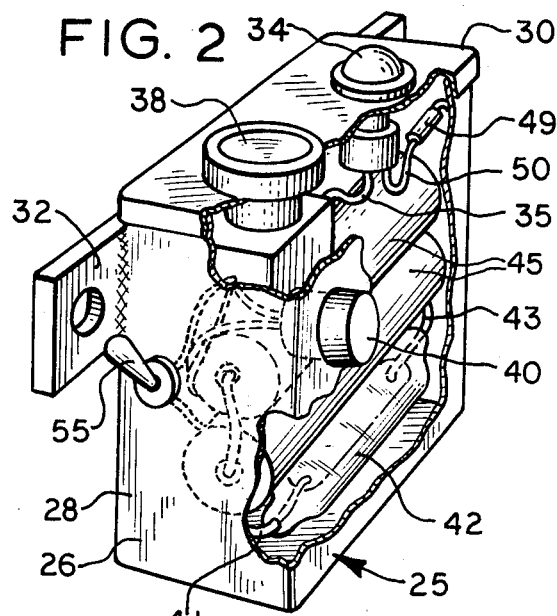
FIG. 2 is an enlarged perspective view of the indicator.
Figure 4:
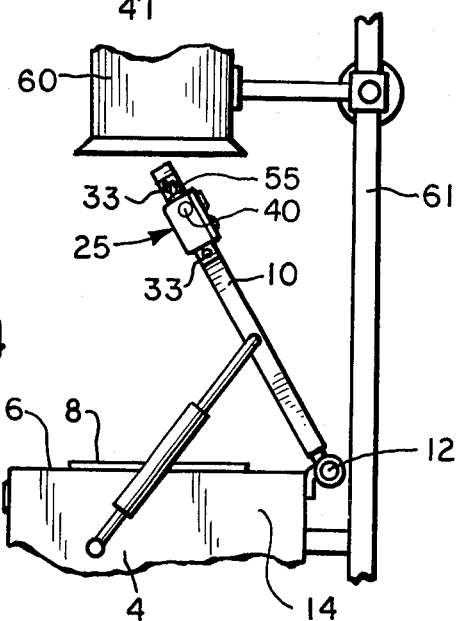
FIG. 4 is a fragmentary view of the apparatus positioned for removal or insertion of a printing plate.
Figure 3:
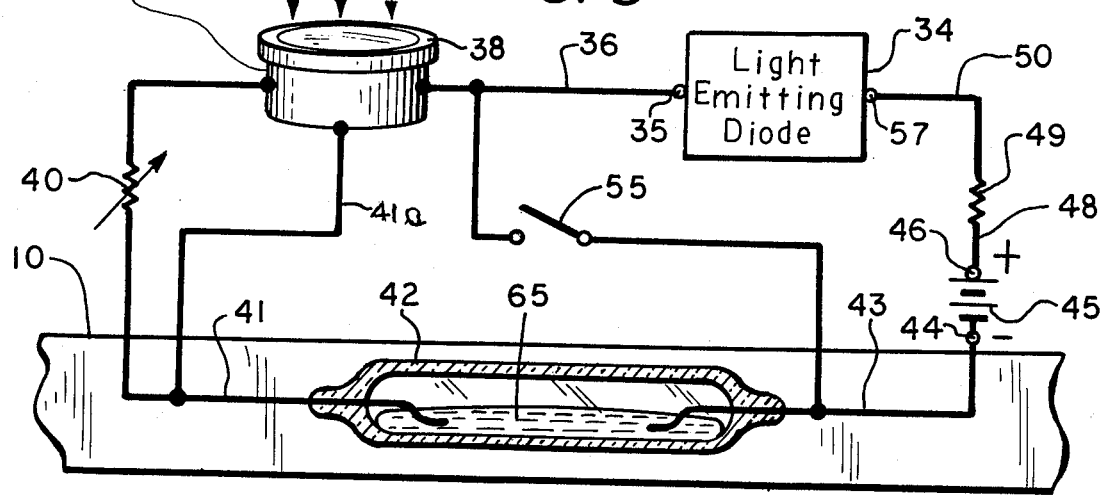
FIG. 3 is a schematic diagram of the components of the invention.

The invention is shown in association with plate maker apparatus generally designated 2 comprising a base table 4, which is adapted to set upon a floor or the like, and is provided with a suitable bed 6 upon which there is mounted in conventional manner an unexposed printing plate assembly 8 as is well known to those skilled in the art. The plate is covered by a masking or glass cover frame or holder 10, which is pivoted at one end on a horizontal axis by suitable pintles 12 to the bed frame 14 which forms the table top. It will be understood that the apparatus thus far described is exemplary and not intended to limit the invention. The metal frame 10 encases a cover glass 16 (FIG. 1) and is adapted to swing between an upright release position shown in FIG. 4, at which time the plate bed of the apparatus is accessible for insertion of an unexposed plate 8 or removal of an exposed plate. When an unexposed plate is placed in the bed, the glass cover is lowered to holding position, as seen in FIG. 1, thereby positioning the exposure indicator 25 in an upright position, it being understood that the term "upright" is used only for purposes of adequately describing the invention in the present environment. The indicator comprises a housing or casing 26, including a hollow lower container portion 28 and a cover 30. A mounting bar 32, for which a permanent magnet or any other attaching means may be used as well known to those skilled in the art, is provided on the case and attached to the glass frame by screw 33.

The indicator comprises a light sensitive diode 34 which has one lead 35 connected to line 36, which is connected to one lead of a light activated silicon controlled rectifier 38. The other end lead of the light sensitive member 38 is connected to one end of a preferably adjustable resistance 40 which controls the sensitivity of the unit 38. The other end of resistor 40 is connected by a line 41 to one end of a position sensitive switch 42, such as mercury switch. The othe end of switch 42 is connected by a wire or line 43 to one pole 44 of a source of electromotive force, such as a battery 45. The other pole 46 of the battery is connected by a wire 48 to one end of a resistance 49 which has its other end connected as by wire or lead 50 to the other lead 51 of the light emitting diode (LED) 34. Also the light activated silicon controlled rectifier is connected to a line 41a which is connected to line 41 bypassing resistor 40. The resistor 49 is approximately 390 ohms and resistor 40 is approximately 4000 ohms. Resistor 40 may be a variable resistor to make the unit sensitive to various light intensities.

A by-pass switch 55 may be connected between the lead 43 and the lead or line 36, and may be closed to test the circuit, but would be open during operation of the device.

As best seen in FIG. 1, the printing plate assembly is installed in the bed and the glass cover is placed over the plate assembly 8. In this position the indicator has its cover upper end 30 facing upwardly and the light sensitive silicone controlled rectifier and the light emitting diode also face upwardly toward the exposure lamp 60 which is carried by a standard 61 from the table to which it is attached. The lamp 60 is activated and the light of selected intensity is directed downwardly and not only exposes the plate but also activates the cell 38, lowering its resistance, so that current flows from the battery through the light emitting diode, the cell 38, the line 41a, line 41, the closed switch 42, and through the respective wires to the other pole, herein shown as the negative pole of the battery. The light sensitive diode glows, informing the user that the activating light 60 has been activated to expose the printing plate. In the meantime, the operator could have been temporarily distracted such as in answering the telephone or doing some other task. The operator then lifts the glass cover frame assembly, swinging it to an upright position. This causes the mercury 65 in the mercury switch 42 to run to one end, opening the switch, whereupon the current ceases to flow and the light emitting diode is extinguished.

After the apparatus is reloaded with a fresh plate, the glass frame assembly is lowered to horizontal position, the mercury switch closes, and the device is in condition to reactivate upon activation of the exposure lamp 60.

DESCRIPTION OF THE EMBODIMENT OF FIGS. 5 and 6

In the arrangement of FIGS. 5 and 6 parts which are similar to the previous embodiments are identified by the same reference numerals.

The indicator device 25 is identical with the previous embodiment except that the switch 75 (which is substituted for switch 42) has a toggle member 44. The device 25 is suitably mounted as by screws as herein shown FIG. 6 or by adhesives etc. to the top plate assembly 78 which is slidable vertically in tracks 79 carried by a pair of upright beams or supports 80,80 of a support frame 81.

The top plate assembly is lowered against a bottom or bed assembly 82 also carried from the standards 80,80. The bed assembly supports the light-activatable plate 83.

In this embodiment the toggle member 77 of the switch 75 is spring-biased to an OFF position so that upon the top plate being lowered to closed position with the bed, the intervening plate or sheet 83, having been placed on the bed, the exposure indicator device 25 is carried downwardly until the member 77 strikes the stop 85 mounted in its path on the adjacent standard 80, whereupon the member 77 swings upwardly to "ON" position. Thus the device is conditioned to be activated by the intense exposure light 87 which is mounted on the cross-frame element 88 of the support. As previously described, the light emitting diode 34 will glow, indicating exposure. As soon as the top plate is lifted, the arm 77 will snap to OFF position extinguishing the diode. After a new light-sensitive medium 83 is replaced and the top plate is lowered closed to the bed, the switch 75 is conditioned to be again activated.

Thus it will be apparent, that a simple, effective, and foolproof indicator has been described, and that in view of the foregoing disclosure, various forms of the invention will now become apparent to those skilled in the art which fall within the terms of the appended claims, which are intended to cover such variations.

What is claimed is:

1. In a plate maker of the type having a printing plate support means for mounting an unexposed printing plate assembly thereon, a holder therefor, means movably mounting the holder between holding and release positions with attendant change of the holder in angular disposition to the horizontal; a light source supported in position to impinge a light of predetermined lumens to a plate assembly carried on the support means; and light-actuable exposure indicator means carried by the movable holder having means providing an indicia signaling exposure of said means to said light; means for maintaining said indicia in said signaling condition; and means for deactivating said indicator means attendant to moving said indicator means with said holder from holding to release positions.

2. The invention according to claim 1 and said indicator means comprising a light emitting diode, and said means for maintaining said indicia in signaling position comprising a holding circuit having position-influenced switching means.

3. The invention according to claim 2 and said circuit comprising a light activated silicon controlled rectifier.

4. The invention according to claim 1 and said exposure indicator means comprising a light emitting diode in series with a light activated silicon rectifier coupled across a source of electromotive potential.

5. The invention according to claim 4 and a position sensitive switch in series with said source of electromotive potential and said exposure indicator means.

6. The invention according to claim 5 and resistance means coupled between said source of electromotive potential and said silicon rectifier for controling the sensitivity thereof.

7. The invention according to claim 6 and resistance means coupled between said source of potential and said light emitting diode.

8. An exposure indicator for signaling exposure of a light-processable medium, having a light-emitting diode means; and a light sensitive silicon rectifier means coupled to said diode; a switch coupled to one of said means, a source of electromotive potential coupled across said switch and the other of said means, said switch having on and off positions, means for disposing said switch to on position in preparation to exposure of said medium to a predetermined light source which is effective to expose said medium and simultaneously activate said rectifier means whereby current flow is effected therethrough and through said diode, whereby causing said diode to glow and thereby signaling exposure of said medium, said indicator adapted to be displaced to another orientation to actuate the switch to off position, thereby extinguishing said diode.

9. The invention according to claim 8 and an adjustable resistance means coupled between said rectifier and said potential source.

10. The invention according to claim 9 and said indicator having a housing comprising means for attachment to an essential component of an associated plate mounting and exposiing mechanism which is movable to insert and remove the printing plate therefrom.

* * * * *